Patented Mar. 30, 1937

2,075,045

UNITED STATES PATENT OFFICE 2,075,045

THERMO-PLASTIC

George James Manson, Hawkesbury, Ontario, Canada

No Drawing. Application January 27, 1933, Serial No. 653,923. Renewed June 16, 1936

8 Claims. (Cl. 106—22)

This invention relates to a thermo-plastic made by combining polymerized vinyl acetate with sulphur and also relates to various uses of this combination. I have found that if polymerized vinyl acetate is mixed and heated with sulphur in various proportions an intimate mixture results, the two materials not separating out, to the eye, when the mass is cooled.

Polymerized vinyl acetate is sold commercially under various trade names and has different degrees of viscosity. The viscosity depends on the degree of polymerization and is determined by dissolving the compound in benzene and making it up so that at 20° C. one litre contains the simple molecular weight in grammes. This is filtered into the apparatus through cotton wool, means being taken to avoid loss of solvent. The time of outflow is then determined by the Ostwald viscosimeter, which has been standardized on a pure solvent (benzene), of which the absolute viscosity is known in centipoises. A convenient viscosity on the final compound used in the present invention is 2.5. The sulphur may be used in any form, such as, flowers of sulphur, ground sulphur or lump sulphur. I prefer to use pulverized sulphur that will pass a 30 mesh screen as sulphur of at least this fineness blends more readily with the polymerized vinyl acetate. The combination takes place more readily if the acetate is also ground comparatively fine.

The unpolymerized vinyl acetate when heated with sulphur will combine with it so that neither of the materials are visible on cooling but I prefer to use the polymerized vinyl acetate as the product is much superior.

I have found that the polymerized vinyl acetates of higher viscosities will blend with more sulphur than those of the lower viscosities.

Convenient proportions to use are the following:—

| | Parts by weight |
|---|---|
| Polymerized vinyl acetate | 100 |
| Sulphur | 50–100 |

The materials in the desired proportions are mixed and heated to 150–200° C. when a combination occurs. The temperature may be increased above 200° C. and a combination will still take place but I have not found it necessary to go above 200° C. to secure a product which is satisfactory for most purposes. It is difficult to determine whether the combination is entirely mechanical or partly mechanical and partly chemical. Polymerized vinyl acetate is clear and hard, very much resembling glass. Sulphur is a yellow crystalline body, whereas the combination product is hard, is not clear, has a very fine fracture and varies in colour from a light gray to a terra cotta shade.

Other suitable proportions are:—

| | Parts by weight |
|---|---|
| Polymerized vinyl acetate (viscosity of 2.5) | 100 |
| Sulphur | 100 |

When the above combination is cooled and ground it can be readily mixed with a water suspension of fibrous material. The fibrous material, the ground combination of polymerized vinyl acetate and sulphur and the water are thoroughly mixed and the water is removed in any of the well known ways, and the resulting product is dried. After drying, the product is hot pressed and when it is cool it is hard and firm with a high degree of resistance to oils—animal vegetable or mineral. Convenient proportions to make a fibrous sheet which is oil resistant are given as follows:—

| | Parts by weight |
|---|---|
| Polymerized vinyl acetate and sulphur combination, ground to 80 mesh | 100 |
| Sulphite pulp | 100 |
| Water | 100,000 |

The resistance to oil and the strength will vary with the content of the polymerized vinyl acetate-sulphur combination in the finished product. If the product is to be used as a container for oil I prefer to use equal parts of pulp or fibrous material and the polymerized vinyl acetate-sulphur combination. If moderate strength alone is required I may use as little as 10% of the combination; this is based on the weight of the fibrous material. Any fibrous material such as ground wood pulp, chemical pulp bleached or unbleached, asbestos or any of the vegetable fibres may be used.

If desired, the polymerized vinyl acetate-sulphur combination may be ground to 80 or 100 mesh and mixed dry with the fibrous material and the mixture hot pressed when the polymerized vinyl acetate-sulphur combination will flow and bind the fibrous material together into a hard compact mass. By either of the above methods, that is wet or dry, gaskets may be made which have a very great resistance to gasoline and oil.

The polymerized vinyl acetate-sulphur combination when in contact with water takes water up and swells. I have found that the addition of a small amount of vegetable, animal or mineral fat such as cottonseed oil or linseed oil, stearic acid or its salts or paraffin wax to the combination of polymerized vinyl acetate-sulphur when it is being formed increases its resistance to water. A piece of board made of equal parts of pulp and the combination will absorb 20% of its weight of water when immersed in water for two hours. If a combination is made as follows:—

| | Parts by weight |
|---|---|
| Polymerized vinyl acetate | 100 |
| Sulphur | 100 |
| Stearic acid | 5 | and a board is made of equal parts of pulp and this combination, the absorption when immersed in water for two hours will only be 5% to 6%. The same resistance to water is obtained if an emulsion of the water resisting material is added to the water suspension of fibrous material and the polymerized vinyl acetate-sulphur combination and thoroughly mixed.

I have found that if a plasticizer is added to the polymerized vinyl acetate-sulphur combination when it is being made that the resulting product is soft and pliable at 20 C., the softness increasing as the amount of plasticizer is increased. Below I give an example:—

| | Parts by weight |
|---|---|
| Polymerized vinyl acetate | 100 |
| Sulphur | 50–150 |
| Plasticizer | 10– 30 |

Any of the well known plasticizers may be used.

Below I give proportions for a mixture which has very useful properties:—

| | Parts by weight |
|---|---|
| Polymerized vinyl acetate | 100 |
| Sulphur | 100 |
| Dibutyl phthalate | 25 |

This mixture is soft and pliable at 20° C. and if worked with water will take up 10% of its weight of water. When it has absorbed this amount of water it is much softer and will slowly flow at ordinary room temperature 20° C. The physical characteristics of this combination make it of particular value as a base for chewing gum instead of chicle. It is tasteless and does not oxidize and harden in air as chicle does. It has the further advantage of being readily obtainable and free from objectionable foreign material.

Various modifications may be made in the invention without departing from the spirit thereof or the scope of the claims, and therefore the exact forms shown are to be taken as illustrative only and not in a limiting sense, and I desire that only such limitations shall be placed thereon as are imposed by the prior art or are specifically set forth in the appended claims.

What I claim as my invention is:

1. A thermo-plastic comprising a blended mixture of polymerized vinyl acetate and a substantial amount of sulphur.

2. A thermo-plastic comprising a blended mixture of polymerized vinyl acetate, a substantial amount of sulphur and a plasticizer.

3. A thermo-plastic comprising a blended mixture of polymerized vinyl acetate, a substantial amount of sulphur and dibutyl phthalate.

4. As a new article of manufacture, a fibrous compound comprising a blended mixture of polymerized vinyl acetate, a substantial amount of sulphur and fibrous materials.

5. A thermo-plastic comprising 100 parts by weight of polymerized vinyl acetate and 50 to 100 parts by weight of sulphur.

6. A fibrous product comprising polymerized vinyl acetate and sulphur each 100 parts by weight, sulphite pulp 100 parts by weight and water.

7. A new article of manufacture for the purpose specified, comprising polymerized vinyl acetate 100 parts by weight or thereabouts, sulphur 50 to 150 parts by weight or thereabouts and plasticizer 10 to 30 parts by weight or thereabouts.

8. A thermo-plastic comprising polymerized vinyl acetate 100 parts by weight or thereabouts, sulphur 100 parts by weight or thereabouts and dibutyl phthalate 25 parts by weight or thereabouts.

GEORGE JAMES MANSON.